US010760922B2

(12) United States Patent
Waldman

(10) Patent No.: US 10,760,922 B2
(45) Date of Patent: Sep. 1, 2020

(54) AUGMENTED REALITY MAPS

(71) Applicant: APPLE INC., Cupertino, CA (US)

(72) Inventor: Jaron Waldman, Palo Alto, CA (US)

(73) Assignee: Apple Inc., Cupertino, CA (US)

(\*) Notice: Subject to any disclaimer, the term of this patent is extended or adjusted under 35 U.S.C. 154(b) by 400 days.

(21) Appl. No.: 15/341,915

(22) Filed: Nov. 2, 2016

(65) Prior Publication Data

US 2017/0074675 A1    Mar. 16, 2017

Related U.S. Application Data

(63) Continuation of application No. 12/705,558, filed on Feb. 12, 2010, now Pat. No. 9,488,488.

(51) Int. Cl.
*G01C 21/36* (2006.01)
*G06T 11/60* (2006.01)
(Continued)

(52) U.S. Cl.
CPC ..... *G01C 21/3647* (2013.01); *G01C 21/3602* (2013.01); *G01C 21/3679* (2013.01);
(Continued)

(58) Field of Classification Search
CPC ............ G01C 21/3602; G01C 21/3679; G01C 21/3647; G01C 21/3682; G06T 11/60; H04N 5/23293; H04N 7/185
See application file for complete search history.

(56) References Cited

U.S. PATENT DOCUMENTS 7,557,736 B1    7/2009 Daily et al.
8,116,526 B2 *  2/2012 Sroka ..................... G06T 15/20
                                                  382/103
(Continued)

FOREIGN PATENT DOCUMENTS

DE    102006056874 A1    6/2008
JP       2007228100 A    9/2007
(Continued)

OTHER PUBLICATIONS

International Preliminary Report on Patentability for International PCT Application No. PCT/US2011/024508, dated Aug. 14, 2012, 9 pages.
(Continued)

*Primary Examiner* — Maria E Vazquez Colon
(74) *Attorney, Agent, or Firm* — Kilpatrick Townsend & Stockton

(57) ABSTRACT

A user points a handheld communication device to capture and display a real-time video stream. The handheld communication device detects geographic position, camera direction, and tilt of the image capture device. The user sends a search request to a server for nearby points of interest. The handheld communication device receives search results based on the search request, geographic position, camera direction, and tilt of the handheld communication device. The handheld communication device visually augments the captured video stream with data related to each point of interest. The user then selects a point of interest to visit. The handheld communication device visually augments the captured video stream with a directional map to a selected point of interest in response to the user input.

25 Claims, 6 Drawing Sheets

(51) Int. Cl.
*H04N 5/232* (2006.01)
*H04N 7/18* (2006.01)

(52) U.S. Cl.
CPC .......... *G01C 21/3682* (2013.01); *G06T 11/60* (2013.01); *H04N 5/23293* (2013.01); *H04N 7/185* (2013.01)

(56) References Cited

U.S. PATENT DOCUMENTS

| | | | | |
|---|---|---|---|---|
| 8,239,130 | B1* | 8/2012 | Upstill | G01C 21/3679 |
| | | | | 701/400 |
| 8,239,132 | B2 | 8/2012 | Ma et al. | |
| 2008/0134088 | A1 | 6/2008 | Tse et al. | |
| 2008/0268876 | A1 | 10/2008 | Gelfand et al. | |
| 2009/0216446 | A1 | 8/2009 | Ma et al. | |
| 2010/0070162 | A1* | 3/2010 | Aihara | G01C 21/3632 |
| | | | | 701/533 |
| 2010/0245561 | A1 | 9/2010 | Yamaguchi et al. | |
| 2010/0268451 | A1* | 10/2010 | Choi | G01C 21/3602 |
| | | | | 701/533 |
| 2011/0016433 | A1* | 1/2011 | Shipley | G06F 3/04815 |
| | | | | 715/849 |
| 2011/0074671 | A1 | 3/2011 | Shimosato et al. | |
| 2011/0141254 | A1 | 6/2011 | Roebke et al. | |
| 2011/0161875 | A1* | 6/2011 | Kankainen | G06F 3/0481 |
| | | | | 715/810 |

FOREIGN PATENT DOCUMENTS

| | | | | |
|---|---|---|---|---|
| JP | 2009058439 A | | 3/2009 | |
| WO | 2005124594 A1 | | 12/2005 | |
| WO | WO 2005124594 A1 * | | 12/2005 | ......... G01C 21/3647 |
| WO | WO-2005124594 A1 * | | 12/2005 | ......... G01C 21/3647 |
| WO | 2006132522 A1 | | 12/2006 | |
| WO | 2008152784 A1 | | 12/2008 | |
| WO | 2009084133 A1 | | 7/2009 | |

OTHER PUBLICATIONS

International Search Report and Written Opinion dated Jun. 1, 2011 for International No. PCT/US2011/024508 (Pub. No. WO 2011/100535) titled "Augmented Reality Maps," to Apple Inc.

Non-Final Office Action dated May 22, 2012, in U.S. Appl. No. 12/705,558, 16 pages.
Final Office Action dated Nov. 21, 2012, in U.S. Appl. No. 12/705,558, 38 pages.
Non-Final Office Action dated Sep. 25, 2015, in U.S. Appl. No. 12/705,558, 38 pages.
Final Office Action dated Jan. 14, 2015, in U.S. Appl. No. 12/705,558, 37 pages.
Non-Final Office Action dated Oct. 7, 2015, in U.S. Appl. No. 12/705,558, 37 pages.
Notice of Allowance dated Jul. 15, 2016, in U.S. Appl. No. 12/705,558, 12 pages.
Livingston, M. et al.; (Resolving Multiple Occluded Layers in Augmented Reality; Proceedings of the Second IEEE and ACM International Symposium on Mixed and Augmented Reality; Oct. 7-10, 2003; pp. 56-65.
Güven, et al. "Visualizing and navigating complex situated hypermedia in augmented and virtual reality," Mixed and Augmented Reality, 2006. ISMAR 2006. IEEE/ACM International Symposium on, vol., no., pp. 155,158, Oct. 22-25, 2006.
Hollerer, Tobias, et al. "User Interface Management Techniques for Collaborative Mobile Augmented Reality." Computers & Graphics 25.5 (2001): pp. 799-810.
Scott Stein, "Augmented reality: iPhone 3G S killer app?" www.cnet.com, Jun. 17, 2009 (Available online at http:// news.cnet.com/ 8301-17938_1 05-1 0266380-1.html, last visited Dec. 14, 2009).
Zee, "Introducing twitter's first augmented reality iPhone app with geo-tagging built in." www.thenextweb.com Dec. 1, 2009; Available online at http://thenextweb.com/applicious/2009/12/01/introducing-augmented-reality- twitter-iphone-app-geotagging-built!, last visited Dec. 14, 2009).
Hile, H., and Borriello, G., "Positioning and Orientation in Indoor Environments Using Camera Phones," Published by the IEEE Department of Computer Science and Engineering of University of Washington, Nov. 16, 2007 (13 pages).
Schöning, J., Cheverst, K., Löchtefeld, M., Krüger, A., Rohs, M., and Faisal, T., "PhotoMap: Using Spontaneously taken Images of Public Maps for Pedestrian Navigation Tasks on Mobile Devices," MobilHCI09, Sep. 15-18, 2009 in Bonn, Germany, (13 pages).
Höllerer, T., and Webster, A., "A Touring Machine: Prototyping 3D Mobile Augmented Reality Systems for Exploring the Urban Environment," Department of Computer Science in Columbia University New York, In Personal Technologies, 1(4), 1997, pp. 208-217.

* cited by examiner

AUGMENTED REALITY MAPS

RELATED APPLICATIONS

This application is a continuation of U.S. patent application Ser. No. 12/705,558 filed on Feb. 12, 2010, the contents of which are incorporated by reference in its entirety for all purposes.

FIELD

The following relates to searching for nearby points of interest, and more particularly to displaying information related to nearby points of interest overlaid onto a video feed of a surrounding area.

BACKGROUND

Augmented reality systems supplement reality, in the form of a captured image or video stream, with additional information. In many cases, such systems take advantage of a portable electronic device's imaging and display capabilities and combine a video feed with data describing objects in the video. In some examples, the data describing the objects in the video can be the result of a search for nearby points of interest.

For example, a user visiting a foreign city can point a handheld communication device and capture a video stream of a particular view. A user can also enter a search term, such as museums. The system can then augment the captured video stream with search term result information related to nearby museums that are within the view of the video stream. This allows a user to supplement their view of reality with additional information available from search engines.

However, if a user desires to visit one of the museums, the user must switch applications, or at a minimum, switch out of an augmented reality view to learn directions to the museum. However, such systems can fail to orient a user's with a poor sense of direction and force the user to correlate the directions with objects in reality. Such a transition is not always as easy as it might seem. For example, an instruction that directs a user to go north on Main St. assumes that the user can discern which direction is north. Further, in some instances, street signs might be missing or indecipherable, making it difficult for the user to find the directed route.

SUMMARY

Such challenges can be overcome using the present technology. Therefore, a method and system for displaying augmented reality maps are disclosed. By interpreting the data describing the surrounding areas, the device can determine what objects are presently being viewed on the display. The device can further overlay information regarding the presently viewed objects, thus enhancing reality. In some embodiments, the device can also display search results overlaid onto the displayed video feed. Search results need not be actually viewable by a user in real life. Instead, search results can also include more-distant objects.

The user can interact with the display using an input device such as a touch screen. Using the input device, the user can select from among objects represented on the screen, including the search results.

In one form of interaction, a device can receive an input from the user requesting directions from a present location to a selected search result. Directions can be overlaid onto the presently displayed video feed, thus showing a course and upcoming turns. As the user and associated device progress along a route, the overlaid directions can automatically update to show the updated path.

In some embodiments the display can also include indicator graphics to point the user in a proper direction. For example, if the user is facing south but a route requires the user to progress north, "no route" would be displayed in the display because the user would be looking to the south but the route would be behind him or her. In such instances, an indicator can point the user in the proper direction to find the route.

In some embodiments, multiple display views can be presented based on the orientation of the device. For example, when the device is held at an angle with respect to the ground of 45 degrees to 180 degrees, the display view can present the augmented reality embodiments described herein. However, when the device is held at an angle less than 45 degrees, an illustrated or schematic view can be represented. In such embodiments, when the device is held at an angle with respect to the ground of less than 45 degrees, the device is likely pointed at the ground, where few objects of interest are likely to be represented in the displayed video. In such instances, a different map view is more likely to be useful. It should be appreciated that precise range of tilt can be adjusted according the actual environment or user preferences.

In practice, a user points a handheld communication device to capture and display a real-time video stream of a view. The handheld communication device detects a geographic position, camera direction, and tilt of the image capture device. The user sends a search request to a server for nearby points of interest. The handheld communication device receives search results based on the search request, geographic position, camera direction, and tilt of the handheld communication device. The handheld communication device visually augments the captured video stream with data related to each point of interest. The user then selects a point of interest to visit. The handheld communication device visually augments the captured video stream with a directional map to a selected point of interest in response to the user input.

A method of augmenting a video stream of a device's present surrounding with navigational information is disclosed. The user can instruct the device to initiate a live video feed using an onboard camera and display the captured video images on a display. By polling a Global Positioning System (GPS) device, a digital compass, and optionally, an accelerometer, location, camera direction, and orientation information can be determined. By using the location, camera direction, and orientation information, the device can request data describing the surrounding areas and the objects therein. In some embodiments, this data includes map vector data. The can be requested from an onboard memory or a server. The data describing surrounding areas can further be requested in conjunction with a search request. The search request can also include a request for information about nearby places of interest.

DESCRIPTION

The technology described herein visually augments a captured image or video stream with data for points of interest related to search terms entered by the user. The technology also visually augments the captured image or video stream with a directional map to a selected point of interest.

Figure 1:
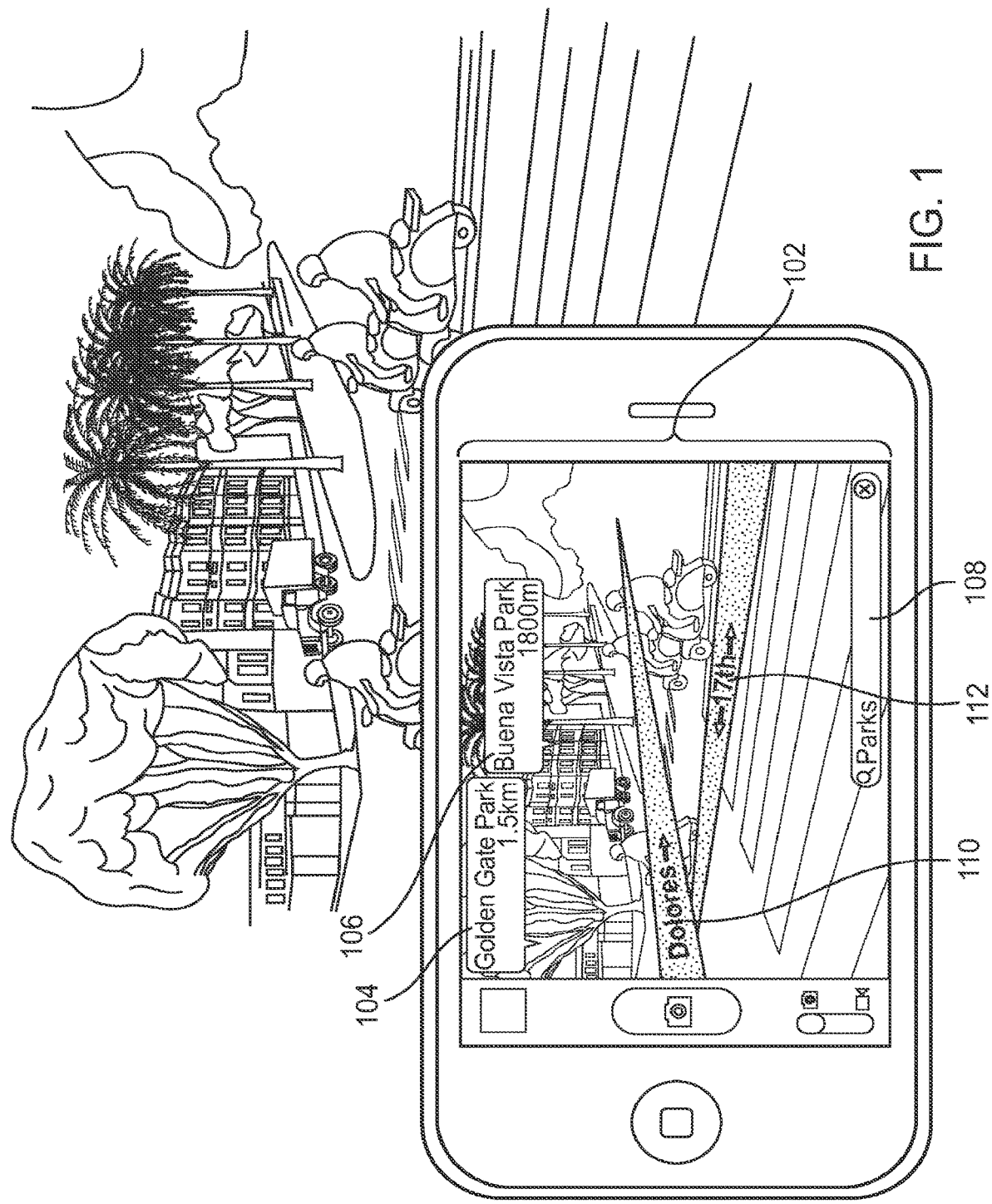
FIG. 1 illustrates an exemplary visually augmented captured image with data related to a search for points of interest.

FIG. 1 is a screenshot illustrating an augmented reality embodiment as described herein. As illustrated, a handheld communication device has captured an image 102 of the northwest corner of the intersection of Dolores Stand 17th St. using its image-capturing device and displayed the image on its display. In this way, the display can function as a viewfinder. As illustrated, the captured image 102 has been augmented with information corresponding to points of interest 104, 106 and street labels 110, 112.

FIG. 1 illustrates a captured and presented image 102 using an image capture device, i.e., the camera of a smart phone, which is but one type of handheld communication device to which the present disclosure can be applied. In this illustrated embodiment, the user has entered a search term "parks" in search bar 108 to conduct a search for nearby parks, i.e., a specific type of point of interest. Using map data that describes the area surrounding the present location of the device and the points of interest located in the surrounding area, the device augments the displayed image with additional information. In this instance, the smart phone or handheld communication device displays points of interest described by the data that are displayed in the viewfinder (such as Dolores St. 110 and 17th St. 112) or within a field of view and range from the geographic position of the device but that are obstructed by other in-screen objects, e.g., Golden Gate Park 104 and Buena Vista Park 106. While other parks might also be nearby, they are not shown because they fall outside the field of view of the device. However, the user could locate these parks by panning the device around the intersection, in which case those parks would appear on the screen.

In the captured image 102, the handheld communication device augments the captured image with bubbles showing the relative geographic position of "Golden Gate Park" 104 and "Buena Vista Park" 106 within the captured image 102. This allows the user to determine a general direction to a point of interest. A user can then select a point of interest, e.g., by selecting the "Buena Vista Park" 106 point of interest information bubble, e.g., by touching the point of interest information bubble with a finger or stylus if the smart phone employs a touch screen. In other implementations, a cursor and mouse can be used to select a desired point of interest.

Points of interest can be any map feature, but most often a point of interest can be a map feature that identified as result of a search for a category of such map features. For example, a point of interest can be a park when a user searches for nearby parks. Likewise a point of interest can be places, buildings, structures, even friends that can be located on a map, when the point of interest is searched for. In some instances a point of interest is not necessarily identified as a result of a search. A point of interest can also be a map feature that is identified by the present system because it can be viewed in the captured image. In short, a point of interest can be any map feature for which the user has an interest.

Figure 2:
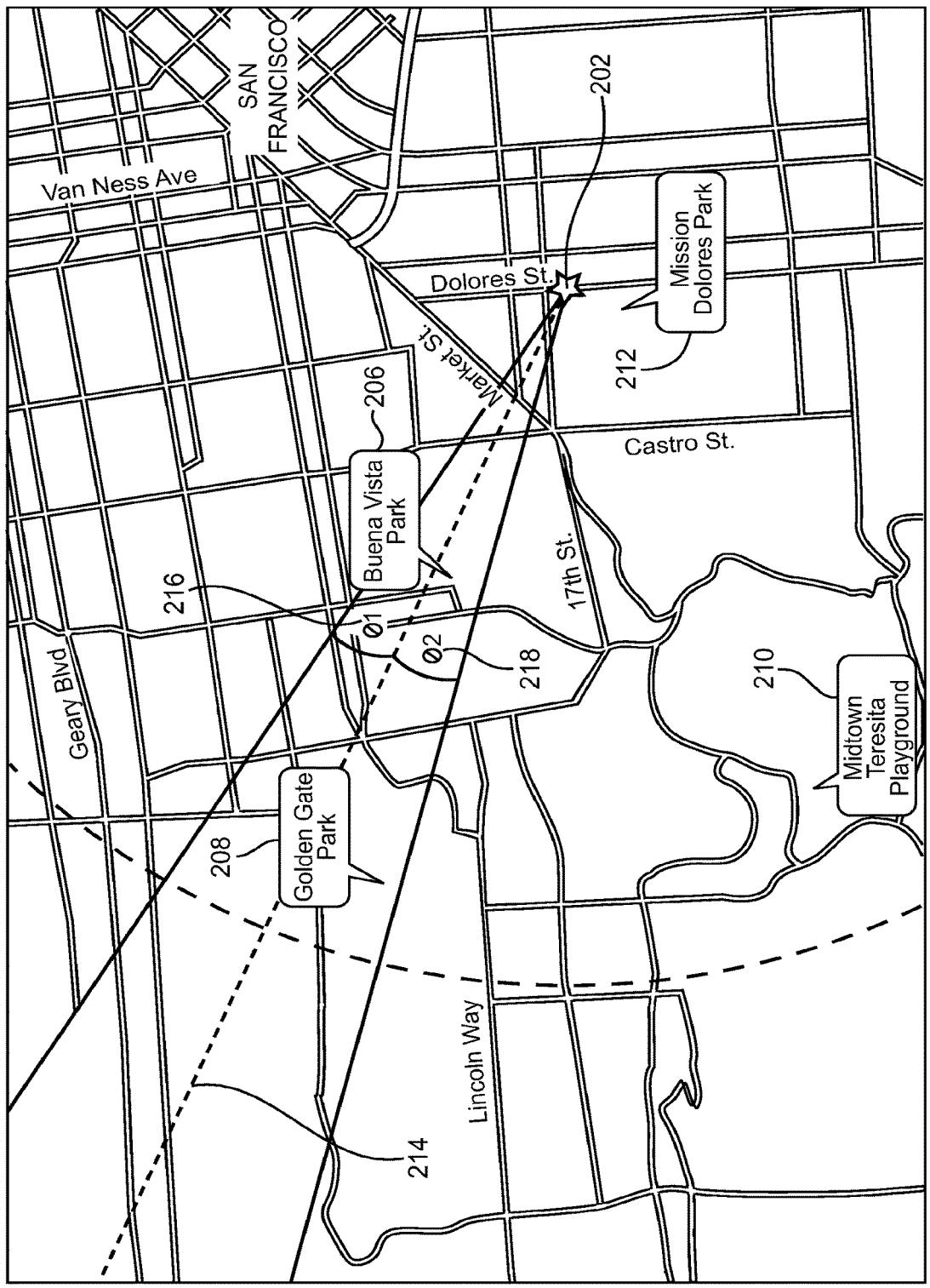
FIG. 2 illustrates the results of a field-of-view and point-of-interest search.

FIG. 2 illustrates search results for point of interest results for nearby parks based on geographic position and also illustrates how a range and field of view correspond to the results displayed in the viewfinder. A handheld communication device captures a video stream of the view as shown in FIG. 1. The handheld communication device detects the geographic position, camera direction, and tilt of the handheld communication device.

The geographic position of the handheld communication device can be determined using GPS coordinates or using triangulation methods using cell phone towers. In yet another example, a blend of GPS coordinates and triangulation information can be used to determine the position of the device.

The camera direction is a direction relative to a planet's magnetic field (i.e., Earth's magnetic field) in which the camera is pointing. The camera direction can be considered a direction that can be identified using a compass, such as a digital compass. The camera direction can be used to identify the direction in which the camera is pointing as it acquires an image to be augmented using the present technology.

The tilt direction is a direction that determines the direction in which either the camera device or display device is pointing relative to a horizontal or vertical axis. The tilt direction can most commonly be determined using an accelerometer.

The user can enter a search request for nearby points of interest based on a search term. In this example, upon entry by the user of a search for nearby "Parks" the handheld communication device sends a request for data related to nearby parks to a map database.

Either the request itself, or the database being queried can determine a relevant range from within which search results must be encompassed. Upon receipt of the request, the database will return search results for points of interest related to the search term that are also within a defined radius of the handheld communication device as illustrated in FIG. 2. As shown in this example, the server returned points of interest "Golden Gate Park" 208, "Buena Vista Park" 206, "Midtown Terrace Playground" 210, and "Mission Dolores Park" 212. The handheld communication device determines that of the point-of-interest search results, only "Golden Gate Park" 208 and "Buena Vista Park" 206 are within the field of view of the handheld communication device. The point-of-interest results "Golden Gate Park" 208 and "Buena Vista Park" 206 are displayed with their relative spatial relationship to the handheld communication device. In the example shown in FIG. 2, the camera direction of the handheld communication device is northwest.

A field of view can be determined using a digital compass to inform the device of the camera direction in which the camera is facing or, alternatively, the user could enter in a heading. As explained above, in FIGS. 1 and 2, the camera is facing northwest and its theoretical line of sight is represented as 214 in FIG. 2. Any search results that are to be displayed on the viewfinder must be within a certain angle of line 214. For example, a camera on a handheld communication device might only be able to display range of view encompassing 30 degrees. In such an instance, a given display would represent those items encompassed within 15 degrees in each direction from the center of the field of view. This concept is illustrated in FIG. 2 wherein

214 illustrates the center of the field of view and angles $\theta_1$ 216=$\theta_2$ 218 and they represent angles from the center of the field of view to the outer limits of the field of view. A distance from the device's geographic location can also be used to define a field of view. As discussed above, a distance or range can be defined by the device in its request for search results or by the database serving the request. Only search results encompassed in this field of view will be displayed on the display.

In some embodiments, a device can also use an accelerometer to inform the device of what objects are displayed in its viewfinder. For example, if the device is in a hilly location, the accelerometer can tell the device that it is pointing downhill. In another example, the device can determine that, due to the topography surrounding its present location (described by map data) an object viewed at a certain angle from the horizon must be a neighboring hill or mountain peak in the distance. In yet another example, an angle from a horizon can indicate that the user is viewing a multiple story building having places of interest in multiple stories of the building. An accelerometer can inform the device of the angle at which the device is pointed.

Figure 3:
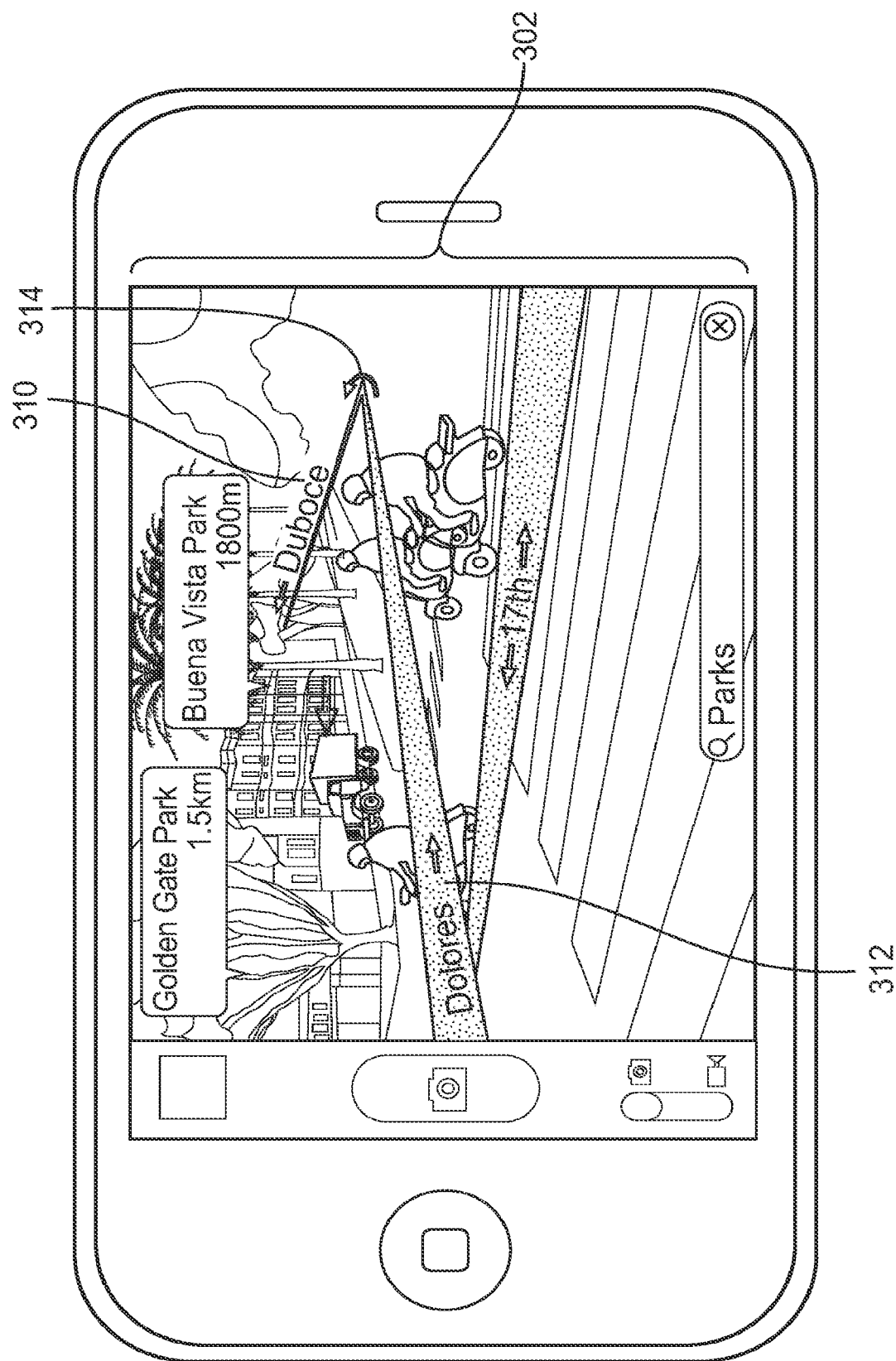
FIG. 3 illustrates an exemplary captured image visually augmented with a route to a selected point of interest.

FIG. 3 illustrates a captured image that has been visually augmented with route data to a selected point of interest. In this example, a user has selected the "Buena Vista Park" point of interest and, in response, the smart phone has visually augmented the captured image 302 with a directional map 310 to the selected point of interest, i.e., "Buena Vista Park". The route shows a direction 312 that the user must travel on Dolores St. to begin travelling to reach "Buena Vista Park." The directional map 310 further indicates a turn 314 that the user must take, i.e., a turn left onto Duboce Ave. from Dolores St. In the illustrated example, the map is shown overlaid onto Dolores St.

The route 310 guides the user with complete navigation illustrations to reach "Buena Vista Park," including any required turns. In some embodiments, the route can be represented as a schematic map, i.e., a simplified map that includes only relevant information for the user in an easy-to-read format.

A schematic map can be thought of as similar to a subway map one would see on a subway train. While the subway track itself might wind and turn, a typical subway map represents the subway route as a mostly straight line. Further, the subway map often does not have any particular scale and frequently shows every destination approximately evenly dispersed along the route. Thus, a schematic map as discussed below is one that does not adhere to geographic "reality," but rather represents map features in a schematic fashion by illustrating directions as a route made of one or more roads, trails, or ways that can be represented as substantially straight lines instead of by their actual shapes (which would be represented in a non-schematic map by adhering to geographic reality). The schematic map can also be devoid of uniform scale. Thus, in some parts of the map, such as an area of the map representing a destination, such area can be "distorted" somewhat to clearly illustrate important details, while map areas that represent portions of a route where there are no turns or other significant features can be very condensed. In short, the map can be a schematic of the real world that can provide a simple and clear representation that is sufficient to aid the user in guidance or orientation without displaying unnecessary map features or detail that could otherwise clutter a small display space.

Figure 4:
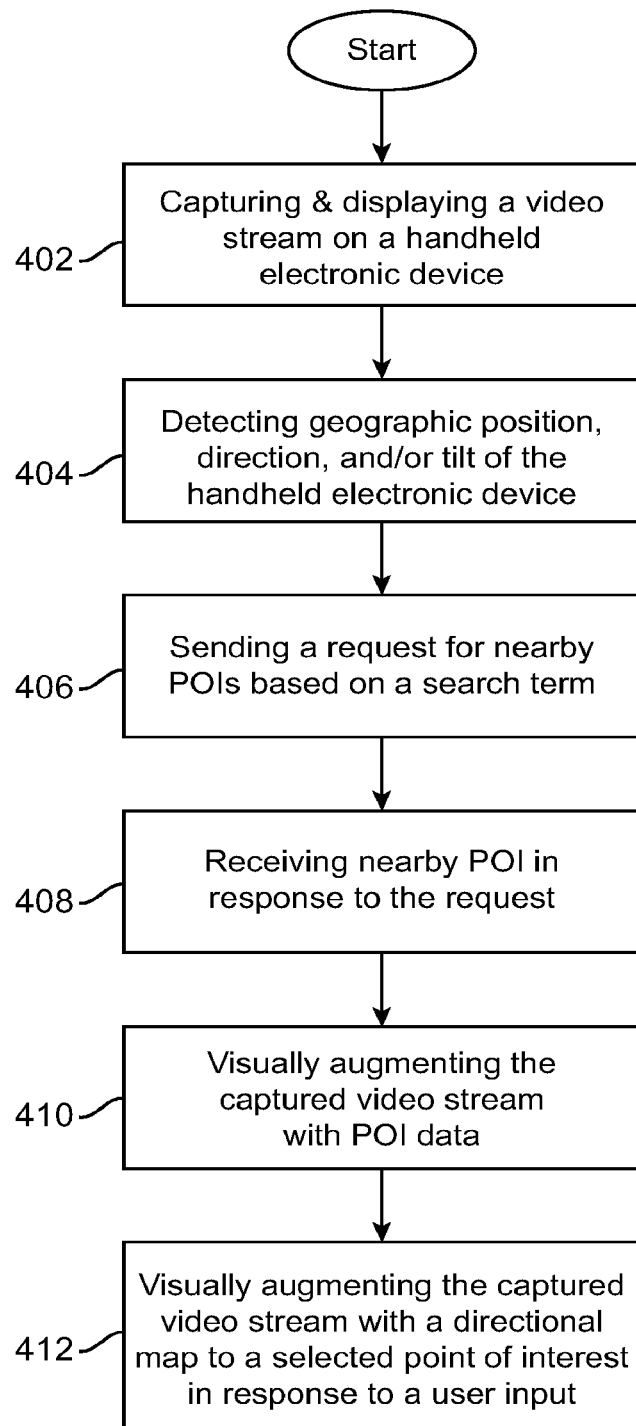
FIG. 4 is a flow chart illustrating an exemplary method of preparing and displaying an augmented reality map.

FIG. 4 is a flow chart illustrating an exemplary method of preparing and displaying an augmented reality map. As shown at block 402, the method includes capturing and displaying a video stream on a handheld communication device. Although described here in reference to a video stream, another embodiment of the disclosed technology includes capturing and displaying a single still image or a series of still images.

As shown at block 404, the method includes detecting geographic position, camera direction, and/or tilt of the handheld communication device. This allows the device to determine features, such as streets, buildings, points of interest, etc., that are within a field of view for the captured video stream.

As shown at block 406, the method includes sending a request for nearby points of interest based on one or more search terms. For example, the user can search for nearby hotels, parks, or restaurants. The request can be sent to a database located on a server that is separate from the handheld communication device and communicate via a wireless protocol. In another embodiment, the database can be stored locally on the device and the search request remains internal (sometimes termed "onboard" the device) to the handheld communication device.

In block 408, the method includes receiving nearby points of interest in response to the request. The server can filter point of interest results in one example. In this example, if the number of returned points of interest exceeds a set threshold, the server can filter the results to only return a fixed number of the best results. Various algorithms can be employed to filter points of interest to a desired number for visual augmentation of a captured video stream. In another embodiment, the handheld communication device can filter point-of-interest results received from the server for optimal display on a handheld communication device.

In block 410, the handheld communication device visually augments the captured video stream with data related to each point of interest. As shown in FIG. 2, the handheld communication device can visually augment a captured video stream with a bubble for each point of interest within the field of view for the handheld communication device. The handheld communication device determines which points of interest are within its field of view by analyzing the geographic position, camera direction, and/or tilt of the handheld communication device in concert with the known geographic position of the returned points of interest.

In block 412, the handheld communication device visually augments the captured video stream with a directional map to a selected point of interest in response to the user input. For example, as described in connection with FIG. 3, the smart phone now visually augments the captured image 302 with a directional map 310 to the selected point of interest in response to the user input. The user input can be a selection of a displayed point of interest to indicate that the user wishes to view navigation data for reaching the selected point of interest.

In some embodiments, the display can also include indicator graphics to point the user in a proper direction. For example, if the user is facing south but a route requires the user to progress north, "no route" would be shown in the display because the route would be behind him or her. In such instances, an indicator can point the user in the proper direction to find the displayed route.

In some embodiments, multiple display views can be presented based on the orientation of the device. For example, when the device is held at an angle with respect to the ground of 45 degrees to 180 degrees, the display view can present the augmented reality embodiments described herein. However, when the device is held at an angle less than 45 degrees, an illustrated or schematic view can be presented. In such embodiments, when the device is held at an angle with respect to the ground of less than 45 degrees, the device is likely pointed at the ground, where few objects of interest are likely to be represented in the displayed video. In such instances, a different map view than the augmented reality map is more likely to be useful. It should be appreciated that precise range of tilt can be adjusted according to the actual environment or user preferences.

Figure 5:
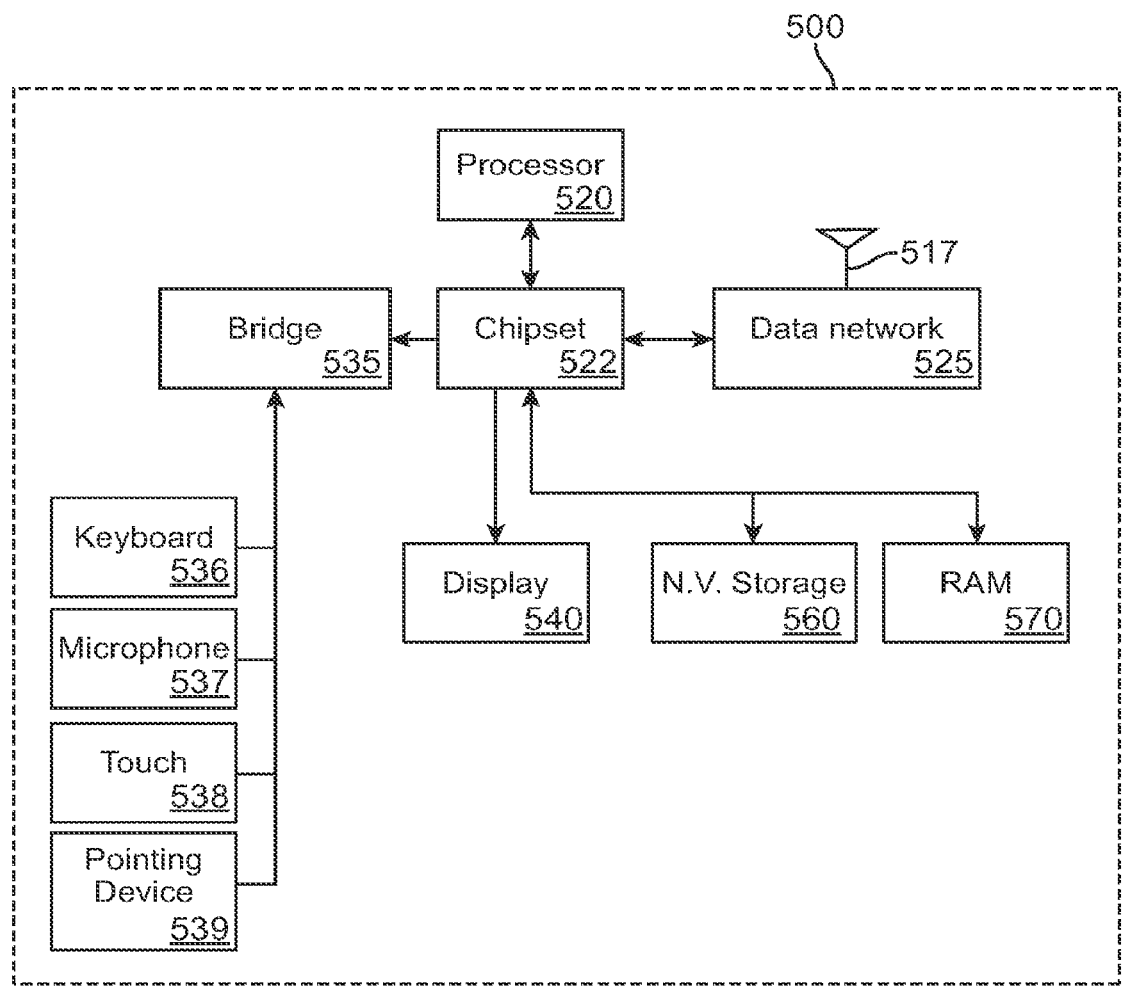
FIG. 5 is a schematic illustration of an exemplary system embodiment.

FIG. 5 illustrates a computer system 500 used to execute the described method and generate and display augmented reality maps. Computer system 500 is an example of computer hardware, software, and firmware that can be used to implement the disclosures above. System 500 includes a processor 520, which is representative of any number of physically and/or logically distinct resources capable of executing software, firmware, and hardware configured to perform identified computations. Processor 520 communicates with a chipset 522 that can control input to and output from processor 520. In this example, chipset 522 outputs information to display 540 and can read and write information to non-volatile storage 560, which can include magnetic media and solid state media, for example. Chipset 522 also can read data from and write data to RAM 570. A bridge 535 for interfacing with a variety of user interface components can be provided for interfacing with chipset 522. Such user interface components can include a keyboard 536, a microphone 537, touch-detection-and-processing circuitry 538, a pointing device such as a mouse 539, and so on. In general, inputs to system 500 can come from any of a variety of machine-generated and/or human-generated sources.

Chipset 522 also can interface with one or more data network interfaces 525 that can have different physical interfaces 517. Such data network interfaces can include interfaces for wired and wireless local area networks, for broadband wireless networks, as well as personal area networks. Some applications of the methods for generating and displaying and using the augmented reality user interface disclosed herein can include receiving data over physical interface 517 or be generated by the machine itself by processor 520 analyzing data stored in memory 560 or 570. Further, the machine can receive inputs from the user via devices keyboard 536, microphone 537, touch device 538, and pointing device 539 and execute appropriate functions, such as browsing functions by interpreting these inputs using processor 520.

While FIG. 5 illustrates an example of a common system architecture, it should also be appreciated that other system architectures are known and can be used with the present technology. For example, systems wherein most or all of the components described within FIG. 5 can be joined to a bus, or the peripherals could write to a common shared memory that is connected to a processor or a bus can be used. Other hardware architectures are possible and such are considered to be within the scope of the present technology.

Figure 6:
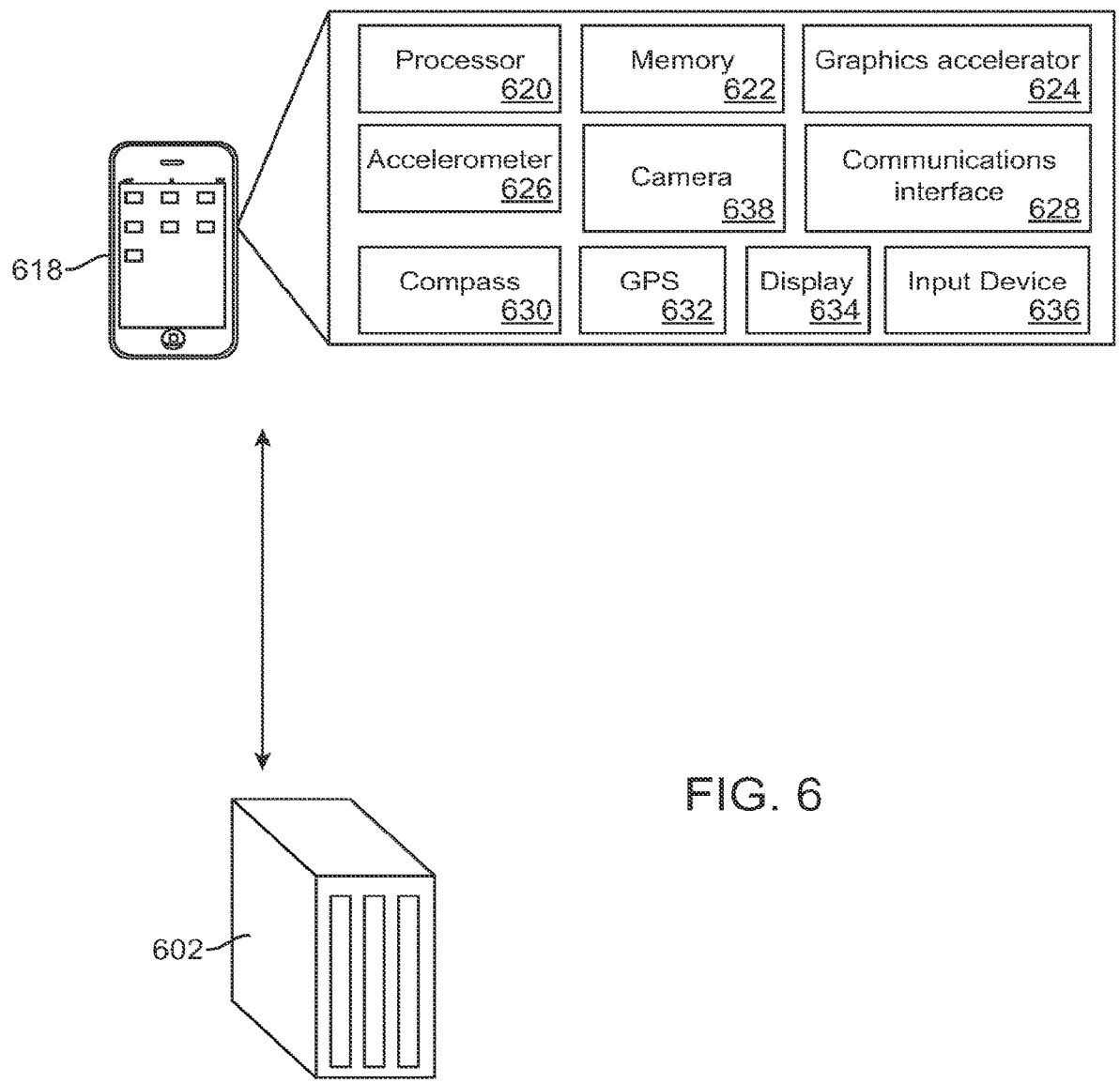
FIG. 6 is a schematic illustration of an exemplary system embodiment.

FIG. 6 illustrates an exemplary system embodiment. A server 602 is in electronic communication with a handheld communication device 618 having functional components such as a processor 620, memory 622, graphics accelerator 624, accelerometer 626, communications interface 628, compass 630, GPS 632, display 634, input device 636, and camera 638. None of the devices are limited to the illustrated components. The components may be hardware, software, or a combination of both.

In some embodiments, the server can be separate from the handheld communication device. The server and handheld communication device can communicate wirelessly, over a wired-connection, or through a mixture of wireless and wired connections. The handheld communication device can communicate with the server over a TCP/IP connection. In another embodiment, the handheld communication device can be directly connected to the server. In another embodiment, the handheld communication device can also act as a server and store the points of interest locally.

In some embodiments, instructions are input to the handheld electronic device 618 through an input device 636 that instructs the processor 620 to execute functions in an augmented reality application. One potential instruction can be to generate an augmented reality map of travel directions to a point of interest. In that case, the processor 620 instructs the camera 638 to begin feeding video images to the display 634. In some embodiments, video images recorded by the camera are first sent to graphics accelerator 624 for processing before the images are displayed. In some embodiments, the processor can be the graphics accelerator. The image can be first drawn in memory 622 or, if available, memory directly associated with the graphics accelerator 624.

The processor 620 can also receive location and orientation information from devices such as a GPS device 632, communications interface 628, digital compass 630 and accelerometer 626. The GPS device can determine GPS coordinates by receiving signals from Global Positioning System (GPS) satellites and can communicate them to the processor. Likewise, the processor can determine the location of the device through triangulation techniques using signals received by the communications interface 628. The processor can determine the orientation of the device by receiving directional information from the digital compass 630 and tilt information from the accelerometer.

The processor can also direct the communications interface to send a request to the server 602 for map data corresponding to the area surrounding the geographical location of the device. In some embodiments, the processor can receive signals from the input device, which can be interpreted by the processor to be a search request for map data including features of interest.

The processor can interpret the location and orientation data received from the accelerometer 626, compass 630, or GPS 632 to determine the direction in which the camera 638 is facing. Using this information, the processor can further correlate the location and orientation data with the map data and the video images to identify objects recorded by the camera 638 and displayed on the display 634.

The processor can receive other inputs via the input device 636 such as an input that can be interpreted as a selection of a point of interest displayed on the display 634 and a request for directions. The processor 620 can further interpret the map data to generate and display a route over the displayed image for guiding the user to a destination (selected point of interest).

As the user follows the specified direction to the selected points of interest, the processor can continue to receive updated location and directional information and video input and update the overlaid route.

Methods according to the above-described examples can be implemented using computer-executable instructions that are stored or otherwise available from computer-readable media. Such instructions comprise, for example, instructions and data which cause or otherwise configure a general-purpose computer, a special-purpose computer, or a special-purpose processing device to perform a certain function or group of functions. Portions of computer resources used can be accessible over a network. The computer-executable instructions may be, for example, binaries, intermediate format instructions such as assembly language, firmware, or source code. Examples of computer-readable media that may be used to store instructions, information to be used, and/or information created during methods according to described examples include magnetic or optical disks, flash memory, USB devices provided with non-volatile memory, networked storage devices, and so on.

Devices implementing methods according to this disclosure can comprise hardware, firmware, and/or software and can take any of a variety of form factors. Typical examples of such form factors include laptops, smart phones, small-form-factor personal computers, personal digital assistants, and so on. Functionality described herein also can be embodied in peripherals or add-in cards. Such functionality also can be implemented on a circuit board among different chips or different processes executing in a single device, by way of further example.

The instructions, media for conveying such instructions, computing resources for executing them, and other structures for supporting such computing resources are means for providing the functions described in this disclosure.

Although a variety of examples and other information have been used to explain various aspects within the scope of the appended claims, no limitation of the claims should be implied based on particular features or arrangements in such examples, as one of ordinary skill would be able to use these examples to derive a wide variety of implementations. Furthermore, and although some subject matter may have been described in language specific to examples of structural features and/or method steps, it should be understood that the subject matter defined in the appended claims is not necessarily limited to those described features or acts. For example, functionality of the various components can be distributed differently or performed in components other than those identified herein. Therefore, the described features and steps are disclosed as examples of components of systems and methods that are deemed to be within the scope of the following claims.

What is claimed is:

1. A method implemented on a handheld communication device having a processor, an image capture device, and a display, the method comprising:
   presenting a captured image on the display, the image being captured by the image capture device;
   detecting a geographic position of the handheld communication device and a camera direction of the image capture device;
   determining a field of view based on the geographic position and the camera direction;
   processing map data describing streets, buildings, and points of interest near the geographic position of the handheld communication device;
   receiving a search input for one or more points of interest within the field of view of the captured image displayed on the display of the handheld communication device;
   identifying one or more points of interest in accordance with the received search input for the one or more points of interest that are:
     within the field of view of the captured image;
     within a certain distance of the geographic position; and
     obstructed by an in-screen object; and
   visually augmenting the captured image with an indication of each of the one or more identified points of interest.

2. The method according to claim 1, further comprising processing the map data to generate a route from the geographic position of the handheld communication device to a selected point of interest, the selected point of interest being one of the one or more identified points of interest.

3. The method according to claim 2, further comprising overlaying an illustration representing at least a portion of the route from the geographic position to the selected point of interest on the captured image by correlating the map data describing the route from the geographic position and the field of view of the image capture device to match objects depicted in the captured image with objects described by the map data.

4. The method according to claim 1, further comprising:
   requesting, from a server, the map data describing an area surrounding the geographic position of the handheld communication device.

5. The method according to claim 1, further comprising:
   searching for places of interest fitting a description of the search input that is input by a user using an input device.

6. The method according to claim 2, further comprising:
   receiving the search input from a touch screen device effective to select the point of interest and generate and display the route to the point of interest on the handheld communication device.

7. The method according to claim 2, wherein the route is overlaid over streets in the captured image.

8. The method according to claim 2, wherein turn arrows are overlaid onto the captured image to indicate upcoming turns in the route as a user travels along the route.

9. The method according to claim 1, wherein points of interest not within the field of view are not displayed on the display, wherein the display comprises a touch screen.

10. The method according to claim 1, further comprising in response to a user panning the handheld communication device:
    updating the captured image presented on the display,
    updating identified points of interest; and
    visually augmenting the captured image with the updated identified points of interest.

11. The method according to claim 1, further comprising in response to a user moving the handheld communication device:
    updating the captured image presented on the display,
    updating identified points of interest; and
    visually augmenting the captured image with the updated identified points of interest.

12. The method according to claim 1, wherein the captured image presented on the display is an image of an outdoor environment.

13. The method according to claim 1, wherein the indication of each of the one or more identified points of interest comprises distance location of the one or more identified points of interest from the geographic position.

14. The method according to claim 1, wherein the captured image presented on the display is an image of an environment in which a user is currently located.

15. A non-transitory computer-readable memory storing instructions which, when executed by one or more processors, cause the one or more processors to:
    present a captured image on a display, the image being captured by an image capture device;
    detect a geographic position of a handheld communication device and a camera direction of the image capture device;
    determine a field of view based on the geographic position and the camera direction;

process map data describing streets, buildings, and points of interest near the geographic position of the handheld communication device;

receive a search input for one or more points of interest within the field of view of the captured image displayed on the display of the handheld communication device;

identify one or more points of interest in accordance with the received search input for the one or more points of interest that are:

within the field of view of the captured image;

within a certain distance of the geographic position; and obstructed by an in-screen object; and visually augment the captured image with an indication of each of the one or more identified points of interest.

16. The computer-readable memory according to claim 15, further comprising instructions which cause the one or more processors to process the map data to generate a route from the geographic position of the handheld communication device to a selected point of interest, the selected point of interest being one of the one or more identified points of interest.

17. The computer-readable memory according to claim 16, further comprising instructions which cause the one or more processors to process overlay an illustration representing at least a portion of the route from the geographic position to the selected point of interest on the captured image by correlating the map data describing the route from the geographic position and the field of view of the image capture device to match objects depicted in the captured image with objects described by the map data.

18. A system comprising:
a memory and one or more processors configured to:
present a captured image on a display, the image being captured by an image capture device;
detect a geographic position of a handheld communication device and a camera direction of the image capture device;
determine a field of view based on the geographic position and the camera direction;
process map data describing streets, buildings, and points of interest near the geographic position of the handheld communication device;
receive a search input for one or more points of interest within the field of view of the captured image displayed on the display of the handheld communication device;
identify one or more points of interest in accordance with the received search input for the one or more points of interest that are:
within the field of view of the captured image;
within a certain distance of the geographic position; and
obstructed by an in-screen object; and
visually augment the captured image with an indication of each of the one or more identified points of interest.

19. The system according to claim 18, further comprising processing the map data to generate a route from the geographic position of the handheld communication device to a selected point of interest, the selected point of interest being one of the one or more identified points of interest.

20. The system according to claim 19, further comprising overlaying an illustration representing at least a portion of the route from the geographic position to the selected point of interest on the captured image by correlating the map data describing the route from the geographic position and the field of view of the image capture device to match objects depicted in the captured image with objects described by the map data.

21. The method according to claim 1, wherein the search input is entered on a touch screen of the display.

22. The method according to claim 1, wherein the search input comprises a search term entered by a user.

23. The method according to claim 1, wherein the captured image comprises a live video image.

24. The method according to claim 1, wherein the captured image comprises a real-time video stream.

25. The method according to claim 1, further comprising in response to panning the handheld communication device:
updating the captured image presented on the display,
updating identified points of interest corresponding to the search input; and
visually augmenting, within the field of view of the captured image, the captured image with updated identified points of interest corresponding to the search input.

* * * * *